(12) United States Patent
Pelzl et al.

(10) Patent No.: US 8,329,789 B2
(45) Date of Patent: Dec. 11, 2012

(54) STABILIZER COMPOSITION FOR HALOGEN-CONTAINING POLYMERS

(75) Inventors: Bernhard Pelzl, Graz (AT); Michael Schiller, Arnoldstein (AT); Cornelia Damm, Halle/Salle (DE)

(73) Assignee: Chemson Polymer-Additive AG, Arnoldstein (AT)

( * ) Notice: Subject to any disclaimer, the term of this patent is extended or adjusted under 35 U.S.C. 154(b) by 0 days.

(21) Appl. No.: 12/863,710

(22) PCT Filed: Jan. 21, 2009

(86) PCT No.: PCT/EP2009/050648
§ 371 (c)(1),
(2), (4) Date: Feb. 9, 2011

(87) PCT Pub. No.: WO2009/092728
PCT Pub. Date: Jul. 30, 2009

(65) Prior Publication Data
US 2011/0143068 A1    Jun. 16, 2011

(30) Foreign Application Priority Data
Jan. 21, 2008  (DE) .......... 10 2008 005 339

(51) Int. Cl.
*C08K 5/34* (2006.01)
*B29C 47/00* (2006.01)

(52) U.S. Cl. .......... 524/100; 428/36.9

(58) Field of Classification Search .......... 524/100
See application file for complete search history.

(56) References Cited

U.S. PATENT DOCUMENTS

| | | | |
|---|---|---|---|
| 3,436,362 A | | 4/1969 | Hayer et al. |
| 5,770,643 A | * | 6/1998 | Wehner et al. .......... 524/91 |
| 6,084,013 A | * | 7/2000 | Wehner .......... 524/100 |
| 6,194,494 B1 | | 2/2001 | Wehner et al. |
| 7,077,981 B2 | | 7/2006 | Wehner et al. |
| 7,358,286 B2 | | 4/2008 | Hopfmann et al. |
| 2006/0079611 A1 | * | 4/2006 | Austen et al. .......... 524/99 |
| 2009/0306257 A1 | | 12/2009 | Wehner et al. |

FOREIGN PATENT DOCUMENTS

| | | |
|---|---|---|
| CN | 1613900 A | 5/2005 |
| DE | 1 569 014 | 4/1970 |
| DE | 1 954 273 | 5/1970 |
| DE | 1 694 873 | 8/1970 |
| DE | 103 01 675 A1 | 7/2004 |
| DE | 10 2004 037 369 | 3/2006 |
| EP | 0 736 569 A1 | 10/1996 |
| EP | 0 768 336 A2 | 4/1997 |
| GB | 1 077 108 | 8/1967 |
| GB | 1 244 685 | 9/1971 |
| GB | 1244685 * | 9/1971 |
| WO | WO 02/072684 A1 | 9/2002 |

OTHER PUBLICATIONS

Schiller et al., Journal of Photochemistry and Photobiology A: Chemistry 149, 227-236, 2002.*
Schiller, et al., "Short Communication Photo-Physics of surface-treated titanium dioxides", Journal of Photochemistry and Photobiology A: Chemistry 149, pp. 227-236 (2002).
International Search Report from the European Patent Office in PCT/EP2009/050648, mailed on Jun. 7, 2009.

* cited by examiner

*Primary Examiner* — Hui Chin
(74) *Attorney, Agent, or Firm* — Finnegan Henderson Farabow Garrett and Dunner, LLP

(57) ABSTRACT

The present invention relates to a stabilizer composition for halogen-containing polymers comprising titanium dioxide and at least one nitrogen-containing compound, wherein the titanium dioxide has a photo-electromotive force (photo-EMK) in the µs-range >−15 mV and a photo-electromotive force in the ms-range >+5 mV.

19 Claims, 9 Drawing Sheets

STABILIZER COMPOSITION FOR HALOGEN-CONTAINING POLYMERS

The present invention relates to a stabilizer composition for halogen-containing polymers, its use in the stabilization of halogen-containing polymers, in particular against undesired pinking, as well as mouldings, which contain this stabilizer composition.

Halogen-containing polymers and plastic materials, respectively, or mouldings prepared therefrom are inclined to substantial changes during their manufacturing method and due to the action of environmental influences. For example, this type of plastic materials may decompose or discolour under influence of heat and/or light. Thus, in order to stabilize halogen-containing polymers, various compounds or compositions have already been used.

A halogen-containing polymer, such as for example polyvinyl chloride (PVC), changes into a polyene structure when a melt-forming process is carried out, whereby hydrochloric acid is eliminated and the polymer is colored. It is conventional to include metal carboxylates as stabilizers into the resin, in order to improve the thermostability of the polymers. However, because an incorporation of the stabilizers alone can lead to so-called metal burning during longer melt-forming processes, which imparts a blackening to the polymer, it is a general practice to incorporate a co-stabilizer. A number of combinations of inorganic and organic compounds are known to be stabilizers for halogen-containing polymers. In recent years, however, nitrogen-containing compounds as stabilizers came into the market. Nitrogen-containing stabilizer compounds have also been described in the patent literature.

For example, DE 1 694 873 describes the use of uracils, which can stabilize against both heat and light.

EP 768 336 describes a stabilizer combination, which contains a pyrimidinone in addition to several components.

EP 736 569 describes the use of specific nitrogen compounds, which are characterised by a very good stabilizing effect for halogen-containing polymers both against oxidative, thermal and light-induced degradation. The color-stabilizing effect during thermal stress is particularly remarkable.

In WO 02/072684 it has been found that systems of at least one or more compounds from the groups of enamines, indoles and ureas and at least one perchlorate salt are particularly suitable for the stabilization of chlorine-containing polymers, in particular PVC. Among other things also aminocrotonates are mentioned (see formula 4).

DE 1 030 1675 again describes that mixtures of at least one alkanolamine and at least one uracil are suitable for the stabilization of chlorine-containing polymers, in particular PVC.

DE 1 954 273 describes the combination of titanium dioxide with a melamine as light-stabilizing pigment, whereas DE 10 2004 037 369 describes a stabilizer system containing a linear or cyclic acylureide and/or a polyaminocrotonic acid ester and a polyepoxypropyl alcohol ether and/or a cyanamide derivative as well as a small amount of $TiO_2$ as pigment.

It has been shown, however, that pinking of the polymer occurs in sunlight or artificial light in case of polymers being stabilized with nitrogen compounds and containing only small amounts of titanium dioxide. So far, this "pinking" has prevented the use of nitrogen-containing compounds in window profiles. The colouring component of this pinking can neither be analyzed nor be simulatively manufactured in a suitable amount, as the change of the color results from the degradation of the halogen-containing polymer according to complex and unknown mechanisms, which do not only depend on the type and intensity of the degrading sources, but also from the type and the amounts of each substance contained in the polymer composition, in particular, for example, from nitrogen-containing compounds or $TiO_2$.

The object of the present invention is to provide new stabilizer compositions being particularly suitable for halogen-containing polymers, without having the above mentioned drawbacks of the known stabilizers. In this context, the object of the invention is also to provide a universal titanium dioxide, which in combination with nitrogen-containing stabilizer compounds does not lead to pinking in sunlight or artificial light.

This object is solved according to the present invention by providing a stabilizer composition for halogen-containing polymers comprising titanium dioxide and at least one nitrogen-containing compound, wherein the titanium dioxide has an photo-electromotive force in μs-range >−15 mV and an photo-electromotive force in the ms-range >+5 mV.

Surprisingly it has been shown that the stabilizer compositions according to the present invention provides an increased stability against the influence of sunlight and artificial light to halogen-containing polymers and the parts and products prepared therefrom. In particular, pinking of the halogen-containing material can be prevented, if it is used in applications, which are used outdoors, such as for example in window profiles.

An object of the present invention is also the use of the stabilizer composition according to the present invention for stabilizing halogen-containing polymers, as well as mouldings of these halogen-containing polymers, which contain a stabilizer composition according to the present invention.

Figure 1:
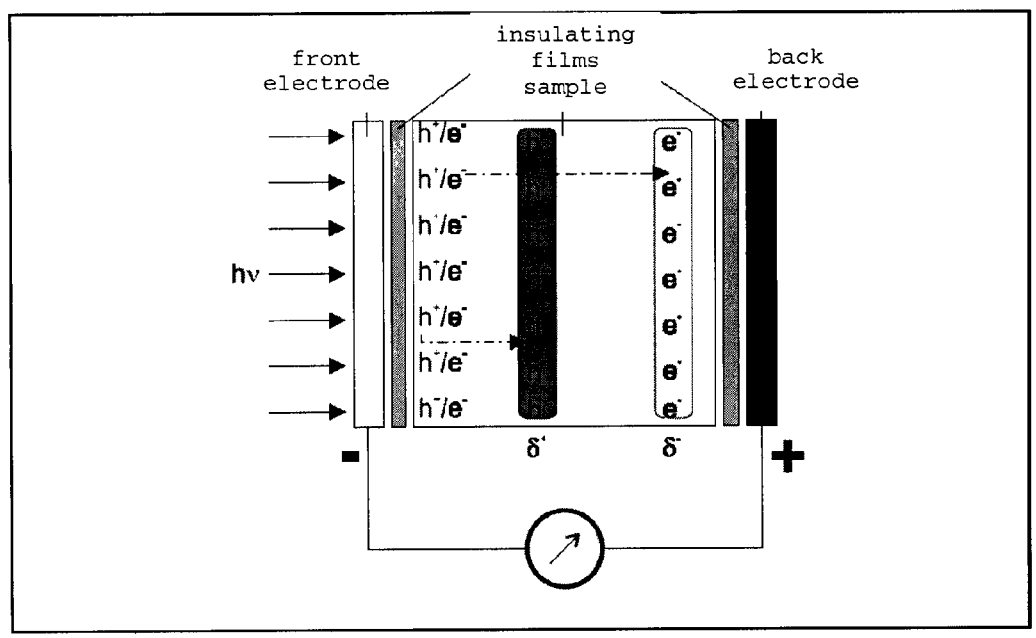
FIG. 1 illustrates a design for the measurement of the photo-EMK.

The present invention will be described in more detail in the following.

The stabilizer composition of the present invention may be used for halogen-containing polymers. Examples of such halogen-containing thermoplastic polymers are polyvinyl chloride (PVC), polyvinylidene chloride, chlorinated or chlorosulfonated polyethylene, chlorinated polypropylene or chlorinated ethylene/vinyl acetate copolymer or similar compounds. Polymers of the PVC type are particularly favourable, i.e. vinyl chloride homopolymers and copolymers of vinyl chloride with other monomers.

One of the components of the stabilizer composition according to the present invention is titanium dioxide. Titanium dioxide essentially occurs in nature in three modifications: anatase, brookite and rutile.

Titanium dioxide has technical relevance as pigment in both anatase and rutile form. The high refraction indices of 2.55 (anatase) and 2.75 (rutile) are responsible for the brightening and coverage ability and thus for the use as white pigment. Rutile absorbs all light below 400 nm, i.e. the entire UV range, in case of a respective dosage. The absorption of anatase is slightly shifted to shorter wavelengths. On the other hand, brookite does not show any photo-catalytic activity.

The titanium dioxide used in the invention is titanium dioxide, which has a specific characteristic. The $TiO_2$ has a photo-electromotive force in the μs-range >−15 mV and a photo-electromotive force in the ms-range >+5 mV. In one embodiment of the present invention the titanium dioxide has a photo-electromotive force in the μs-range >−10 mV and a photo-electromotive force in the ms-range >+10 mV.

The term "photo-electromotive force" (photo-EMK) denotes the effect, which occurs, if electrons from the valence band of a compound are transferred under the influence of light and/or heat into the next higher band, the so-called conduction band, wherein thereby a photo-semiconductor results. By this transfer the electron leaves a "hole", into which an adjacent electron can jump. Moreover, electrons may jump from the conduction band back into the "hole" in the valence band. This charge transfer of the photo-semiconductor can be characterized in form of the photo-EMK. The photo-EMK also depends on the wavelength of the excitation flash. A photo-EMK can only be observed, if the sample is absorbing the excitation light. For example, $TiO_2$ only absorbs in the UV range.

For the measurement of this photo-EMK the compounds, which should be examined, are introduced into a polymeric matrix, such as described in for example M. Schiller et al., *Journal OF Photochemistry and Photobiology A: Chemistry*, 149 (2002) 227-236. For example, a certain amount of the test substance, for example 100 mg, was dispersed in a predetermined amount of polyvinyl butyral (PVB) in 1,2-dichloroethane, for example 3 g of a 10% solution, for example using ultrasound. This mixture was poured onto a glass plate having an exactly defined surface. The surface may be, for example about >27 $cm^2$, for example about >47 $cm^2$. The applied layer should have been as thin as possible. Using the above-mentioned ratios, the optimum layer thickness results due to, for example, the mass of the PVBs. If more substance is weighed in the outlet surface has to be selected in larger scale. Drying of the layers is carried out in a solvent atmosphere. The dried dispersion layers are removed from the glass plate and the solvent residues are removed at room temperature under vacuum. The dispersion layers have a total absorption in the UV range and a layer thickness of, for example, about 60 to about 80 μm. The samples have been stored at a relative humidity of 100% (in the desiccator over water).

During measurements of the photo-EMK the sample is located between transparent front and back electrodes in an electrically insulated form (FIG. 1). A high-impedance voltmeter is connected to both electrodes. In case the sample is exposed through the front electrode with a short flash, a voltage and its decay process can be determined at the measurement device, by electroless tapping the voltage, which is developed in the sample, at the electrodes and which is recorded for example at an oscillograph. The insulation between sample and electrodes is essential, as decay processes should be examined in the sample and thus electron transfer between sample and electrode needs to be avoided.

For example, the transparent front electrode consists of quartz glass, which is vaporized with ITO, as this material is light-transmissive and exhibits corresponding electrical properties. The back electrode may be for example brass, wherein other materials known to the skilled person may be used.

The light source may be a laser, for example a 100 kW nitrogen laser may be used. The wavelength of the excitation flash depends on the used laser. For example, the wavelength of the excitation laser may be 337 nm. The pulse duration is in the range from 0.2 to 0.5 ns, for example the pulse duration is 0.3 ns. It is advantageous that the maximum of the photo-EMK does not considerably depend on the intensity of the excitation flash.

By means of the above explained arrangement, photo-EMK signals are registered in two different time scales:
a) Short-term range: signal to 2.5 μs after the flash for registration of the rapid decay processes
b) ms range: signal to 100 ms after the flash for registration of the slow decay processes.

In all cases mentioned above, first the signal of the first flash is registered. Subsequently, an acquisition measurement may be carried out. In this case the sample is exposed several times in specific time intervals, for example in an interval of 120 s, wherein the oscillograph averages the signals. The acquisition measurement is performed in order to examine possible charge effects of the samples. Thus, the signal-to-noise ratio is improved increasing the accuracy of a kinetic analysis of the signals. After the acquisition measurement a new sample is inserted.

Normally, the measurements are carried out at normal pressure and at a temperature of 25° C. Different measurement conditions are also possible.

From the experimental curves the maximum value $U_{max}$ of the photo-EMK has been determined. $U_{max}$ is a relative measure for the efficiency of separation of charge at exposure. The decay process of the photo-EMK has been evaluated according to a bi-exponential time law (equation (1)).

$$U(t) = U_1^0 \exp(-k_1 t) + U_2^0 \exp(-k_2 t) \tag{1}$$

$U_1^0$ and $U_2^0$, respectively, represent charge carrier amounts at the beginning of the decay process near the surface ($U_2^0$) and in the volume ($U_2^0$), respectively. The decay constants $k_1$ and $k_2$ are a relative measure for the speed of the recombination near the surface ($k_1$) and in the volume ($k_2$).

The photo-EMK signals of a dispersion layer of some of the tested $TiO_2$-charges are shown in FIGS. 3 to 8. Here, PVB was used as binder and a laser having $2.7*10^{13}$ quanta per flash. The flash interval was 120 s, the recorded time was between 0-2.5 μs and 0-200 ms, respectively. The exact test procedure is described in the experimental section.

Surprisingly, it has now been shown, that by the addition of so defined titanium dioxide to halogen-containing polymers, which contain nitrogen stabilizers, pinking of the polymeric material under the influence of artificial light or sunlight may be avoided or at least greatly reduced. This stabilizing effect also occurs, if the halogen-containing polymer contains further stabilizers, co-stabilizers or additives.

Without being bound on any particular theory, it is believed that the influence of the titanium dioxide on charge-transfer complexes formed during the use of stabilizer compositions increases. It is known that nitrogen compounds act as electron donors in stabilizer compositions. For example, 1,3-dimethyl-4-aminouracil (DMAU) should be mentioned, which may replace unstable Cl-atoms in a PVC chain in a nucleophilic substitution. These nitrogen compounds may also act as electron donors in charge-transfer-(CT)-complexes.

Titanium dioxide may be considered as electron acceptor. In case of light exposure, an electron is lifted from the valence band in the conduction band. In the valence band a positive charged hole remains, which may act as electron acceptor. Thus, for example, a CT-complex between titanium dioxides and DMAU may be formed. This becomes significant by the fact that combinations of PVC with a stabilizer composition of titanium dioxide and, for example, DMAU changes colour to pink after a certain amount of time in artificial light or natural light. In order to prevent or reduce this pinking (pink discoloration), it has to be tried to avoid the formation of the CT-complexes being responsible for the pinking. The present invention is based on this principle, i.e. by using specific titanium dioxides this pinking may be eliminated.

The titanium dioxide according to invention may be added separately to the polymer or the polymer mixture. It is also possible to add the titanium dioxide together with the nitrogen compound or other (co)-stabilizers or the below listed additives to the polymer or a polymer mixture. For example a dosage in the extruder, e.g. in the vacuum zone, is also encompassed by the present invention.

For outdoor applications the titanium dioxide according to the invention is preferably of rutile structure. For all other applications it may be both anatase and rutile structure. The inventive titanium dioxide may also be provided with a coating. The coating may consist of inorganic or organic materials. For example, inorganic coatings may be based on aluminium oxides, silicium oxides and/or zirconium oxides. On the other hand, organic coatings may be, for example, polydi-/monoalkyl siloxanes or stearic acid and their derivatives. The thickness of the coating is not important for the inventive use of the titanium dioxides.

The titanium dioxide may be used according to the invention in an amount from about 0.01 to about 20 parts per 100 parts (phr="per hundred resin") resin (polymer) in the stabilizer composition. In another embodiment the titanium dioxide may be used in an amount from about 0.05 to about 10.0 phr or from about 0.1 to about 5 phr, for example in an amount of about 2 phr. The titanium dioxide should be present in fine distributed form and well dispersible. In one embodiment of the present invention the particle size is <5 µm, for example <2 µm. In another embodiment the particle size is <1 µm. What is crucial is that the particle size is chosen in such a way that the stabilizing effect of the composition of the present invention occurs.

The nitrogen containing compounds of the stabilizer composition of the present invention are such nitrogen compounds, which are currently used as stabilizer compounds for halogen-containing polymers. For example, these compounds may be selected from the group consisting of a heterocyclic compound and an amine. Examples for such heterocyclic nitrogen compounds include, but are not limited to, substituted or unsubstituted uracil, pyrimidone, indole, (thio) urea, aminocrotonic acid ester or the like.

The uracil may have the following formula (I)

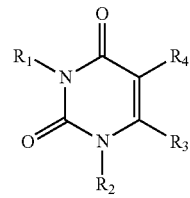

(I)

wherein $R_1$, $R_2$, $R_3$ and $R_4$ are independently H, $C_1$-$C_{18}$ alkyl, $C_2$-$C_5$ alkenyl, $C_1$-$C_4$ alkoxy, $C_5$-$C_8$ cycloalkyl, $C_5$-$C_{10}$ aryl, wherein $R_3$ and $R_4$ may be independently $NHR_5$, wherein $R_5$ is independently to $R_1$ or $R_2$, H, $C_1$-$C_{18}$ alkyl, $C_2$-$C_6$ alkenyl, $C_1$-$C_4$ alkoxy, $C_5$-$C_8$ cycloalkyl, $C_5$-$C_{10}$ aryl.

The term "alkyl" refers to fully saturated aliphatic hydrocarbons. In certain embodiments, an alkyl comprises 1 to 18 carbon atoms. A numerical range, such as "1 to 18", means, whenever it occurs, that for example an $C_1$-$C_{18}$ alkyl group refers to an alkyl group comprising 1 carbon atom, 2 carbon atoms, 3 carbon atoms and so on, up to and including 20 carbon atoms. The alkyl group may be optionally substituted. Examples of alkyl groups include, but are not limited to, methyl, ethyl, n-propyl, isopropyl, n-butyl, isobutyl, sec-butyl, tert-butyl, pentyl, hexyl, heptyl, octyl and the like.

The term "alkenyl" refers to aliphatic hydrocarbons having one or more double bonds. In particular embodiments an alkenyl comprises 2 to 6 carbon atoms. The alkenyl group may be optionally substituted. Examples of alkenyl compounds include, but are not limited to, ethenyl, propenyl, 1,4-butadienyl and the like.

The term "alkoxy" refers to aliphatic hydrocarbons having a —O-alkyl unit. In particular embodiments an alkoxy comprises 1 to 4 carbon atoms. The alkoxy group may be optional substituted. Examples of alkoxy compounds include, but are not limited to, methoxy, ethoxy, propoxy, tert.-butoxy and the like.

The term "cycloalkyl" refers to cyclic saturated hydrocarbons. In particular embodiments a cycloalkyl comprises 5 to 8 carbon atoms. The cycloalkyl group may be optional substituted. Examples of cycloalkyl compounds include, but are not limited to, cyclopentane, cyclohexane, cycloheptane, cyclooctane and the like.

The term "aryl" refers to an aromatic ring wherein each of the atoms forming the ring is a carbon atom. Aryl rings may be formed by five, six, seven, eight, nine, or more than nine carbon atoms. For example, aryl compounds may contain up to 15 carbon atoms. The aryl group may be optionally substituted. Examples of aryl compounds include, but are not limited to, cyclopentadienyl, phenyl, and the like.

The term "optional substituted" refers to a group in which one or more hydrogen atoms have been replaced by a substituent. The substituent may be alkyl, alkoxy, cycloalkyl, aryl, hetero aryl, OH, CN, halogen, $NO_2$ or an amine, however, is not limited to.

In an embodiment the uracil is 1,3-dimethyl-4-aminouracil.

Further nitrogen compounds according to formula (II) may be used,

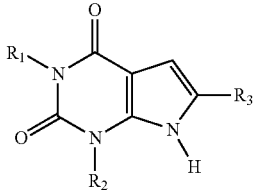

(II)

wherein $R_1$, $R_2$ and $R_3$ may be as indicated above.

Further examples for the above-mentioned nitrogen compounds are aminocrotonic acid ester of the general formula (III)

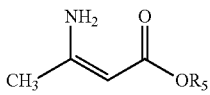

(III)

wherein $R_5$ may be H, $C_1$-$C_{18}$ alkyl, $C_2$-$C_6$ alkenyl, $C_1$-$C_4$ alkoxy, $C_5$-$C_8$ cycloalkyl or $C_5$-$C_{10}$ aryl, or wherein $R_5$ may be selected in such a way that a symmetrical aminocrotonic acid ester is formed. Symmetrical in this context means that the molecule may be cleaved at a point, in order to obtain two similar molecules.

Examples for aminocrotonic acid ester are butylenglycolaminocrotonate (=BGAC)

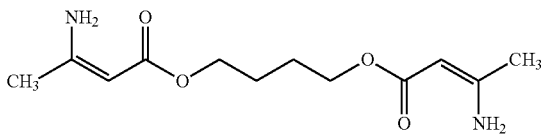

and thioethyleneglycolaminocrotonate (=TGAC)

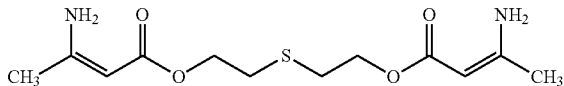

Examples for compounds from the group of ureas are urea and tetramethylurea.

The nitrogen compounds may be used in an amount of about 0.01 phr to about 1 phr or about 0.05 phr to about 0.8 phr. In one embodiment the nitrogen compounds may be used in an amount of about 0.1 to about 0.5 phr.

The titanium dioxide according to the invention may further be combined with one or more additives, such as for example primary stabilizers, co-stabilizers, zeolites, antioxidants, fillers, softeners, dyes, pigments, antistatic agents, surface-active agents, foaming agents, impact modifiers, UV stabilizers, lubricants, processing means or the like.

Co-stabilizers are compounds providing additional stabilizing effect for halogen-containing polymers, if used in the stabilizer composition according to the present invention. Possible co-stabilizers may be selected from the group consisting of 1,3-diketone compounds, polyols, metal salts, natural or synthetic minerals, such as hydrotalcites, hydrocalumites and zeolites, amino acid derivatives, organic esters of phosphorous acid, and epoxy compounds.

Examples for 1,3-diketone compounds include, but are not limited to, dibenzoylmethane, stearoyl benzoylmethane, palmitoyl benzoylmethane, myristoyl benzoylmethane, lauroyl benzoylmethane, benzoylacetone, acetylacetone, tribenzoylmethane, diacetylacetobenzol, p-methoxystearoyl acetophenone, acetoacetic acidester and acetylacetone as well as their metal salts, in particular those of lithium, sodium, potassium, calcium, magnesium, zinc, tin, titanium, aluminium and/or iron.

Co-stabilizers from the group of polyols include, but are not limited to, glycerol, pentaerythritol, di- and tripentaerythrit, trismethylolpropane (TMP), di-TMP, THEIC, sorbitol, mannitol, malitol, saccharides, disaccharides {in particular sucrose, 4-O-β-D galactopyranosyl-D-glucose, 4-O-alpha-D-glucopyranosyl-D-glucose, 6-O-{6-deoxy-alpha-L-mannopyranosyl)-D-glucose, alpha-D-glucopyranosyl-alpha-D-glucopyranoside, 6-O-alpha-D-glucopyranosyl-D-glucose, 4-O-β-D-glucopyranosyl-D-glucose, 2-O-β-D-glucopyranosyl-D-glucose, 6-O-alpha-D-glucopyranosyl-D-glucitol, 3-O-alpha-D-glucopyranosyl-D-fructose, 6-Oβ-D-glucopyranosyl-D-glucose, 4-O-β-D-galactopyranosyl-D-glucitol, 4-O-alpha-D-glucopyranosyl-D-glucitol, 6-O-alpha-D-galactopyranosyl-D-glucose, 3-O-alpha-D-galactopyranosyl-D-myo-inositol, 4-O-β-D-galactopyranosyl-D-fructose, 4-O-β-D-galactopyranosyl-β-D-glucopyranose, 6-O-alpha-D-glucopyranosyl-D-fructose, 4-O-β-D-galactopyranosyl-alpha-D-glucopyranose, 2-O-(6-deoxyalpha-L-mannopyranosyl)-D-glucose, 4-O-alpha-D-glucopyranosyl-D-fructose, 2-O-β-D-glucopyranosyl-alpha-D-glucopyranose, 1-O-alpha-D-glucopyranosyl-D-mannitol, 6-O-(6-deoxy-alpha-L-mannopyranosyl)-β-D-glucopyranose, 2-O-3-D-glucopyranosyl-β-D-glucopyranose, 6-O-alpha-D-glucopyranosyl-alpha-D-glucopyranose, 2-O-alpha-D-glucopyranosyl-alpha-D-glucopyranose, 2-O-alpha-D-glucopyranosyl-β-D-glucopyranose, 1-O-alpha-D-glucopyranosyl-D-fructose, 6-O-alpha-D-glucopyranosylalpha-D-fructofuranose, 6-O-alpha-D-glucopyranosyl-D-glucitol, 4-O-β-D-galactopyranosyl-D-glucitol, 4-O-alpha-D-glucopyranosyl-D-glucitol, 1-O-alpha-D-glucopyranosyl-D-mannitol), trisaccharides, polysaccharides, in particular polyvinyl alcohols, starch, cellulose and their partial esters.

Examples for antioxidants include, but are not limited to, alkyl phenols, hydroxyphenylpropionates, hydroxybenzyl compounds, alkylidene bisphenoles, thiobisphenoles and aminophenoles, in particular, for example, 2,6-di-tert.-butyl-4-methyl-phenol, 2,6-di-benzyl-4-methyl-phenol, stearyl-3-(3'-5'-di-tert.-butyl-4'-hydroxyphenyl)propionate, 4,4'-thio-bis-(3-methyl-6-tert.-butylphenol), 4-nonylphenol, 2,2'-methylenebis-(4-methyl-6-tert.-butylphenol), 2,5-di-tert.-butyl-hydroquinone, 4,4',4"-(1-methyl-1-propanyl-3-ylidene)tris-[2-(1,1-dimethylethyl)-5-methyl phenol, their neutral or basic lithium-, magnesium-, calcium-, zinc- and aluminium salts, as well as thioethers, steric hindered amines and/or phosphonites as well as mixtures thereof.

Examples for co-stabilizers from the group of metal salts include, but are not limited to, hydroxides, oxides, carbonates, basic carbonates and carboxylic acid salts of lithium, sodium, potassium, magnesium, calcium, aluminium, titanium and the like. In one embodiment of the present invention the metal salts may be salts of higher carboxylic acids, for example $C_6$-$C_{22}$ carboxylic acids, such as for example stearic, palmitic, myristic, lauric, oleic, and ricinoleic acid.

Examples for natural and synthetic minerals include, but are not limited to, A3-, A4-, A5-zeolites, zeolites of the mordenite, erionite, faujasite X- or Y-type as well as ZSM-5-zeolites, hydrotalcites (of the Alcamizer-1 and -4 type) and/or mixtures thereof. Preferred replaceable cations therein may be protons, ammonium-, lithium-, sodium-, potassium-, magnesium-, calcium-, zinc-, and/or tin-cations.

Examples for co-stabilizers from the group of amino acid derivatives include, but are not limited to, glycine, alanine, lysine, tryptophan, Acetylmethionine, pyrrolidone carboxylic acid, α-aminocrotonic acid, α-aminoacrylic acid, α-aminoadipic acid and the like, as well as the corresponding esters thereof. The alcohol components of these esters may comprise monohydric alcohols, such as for example methyl alcohol, ethyl alcohol, propyl alcohol, i-propyl alcohol, butyl alcohol, α-ethylhexanol, octyl alcohol, i-octyl alcohol, lauryl alcohol, stearyl alcohol and the like, as well as polyols, such as for example ethylene glycol, propylene glycol, 1,3-butandiol, 1,4-butandiol, glycerol, diglycerol, trismethylolpropane, pentaerythritol, dipentaerythritol, erythrithol, sorbitol, mannitol and the like.

Examples for co-stabilizers from the group of esters of the phosphorous acid include, but are not limited to, triarylphosphites, such as for example triphenyl phosphite, tris(p-nonylphenyl) phosphite; alkylarylphosphite, such as for example monoalkyldiphenylphosphite, e.g. diphenylisooctylphosphite, diphenylisodecylphosphite; and dialkylmonophenylphosphites, such as for example phenyldiisooctylphosphite, phenyldiisodecylphosphite; and trialkylphosphites, such as triisooctylphosphite, tristearylphosphite and the like.

Examples for co-stabilizers from the group of epoxy compounds include, but are not limited to, various animal or vegetable oil, as for the example epoxy soy oil, epoxy rape oil, epoxidized carboxylic acid esters, such as for example epoxidized epoxy methyloleate, epoxy butyloleate, epoxidized alicyclic compounds, glycid ether, such as bisphenol-A-diglycidether bisphenol-A-diglycidether; glycidester, such as glycidyl acrylate, glycidyl methacrylate, their polymers and copolymers; and epoxidized polymers, such as epoxidized polybutadiene, epoxidized ABS, and the like.

Exemplary, chalk or coated chalk should be mentioned as fillers, wherein the fillers are not limited thereon.

Paraffin wax may exemplary be used as a lubricant.

Fillers may be used in an amount of about 0 to about 100 phr or from about 1 to about 50 phr. In one embodiment of the present invention fillers may be used in an amount from about 2 to about 20 phr. Softeners may be used in an amount from about 0 to about 100 phr, for example from about 0.05 to about 50 phr. Lubricants may be used from about 0.05 to about 3 phr, for example from about 0.1 to about 2 phr.

The above-mentioned further co-stabilizers may be used in amounts similar to that of the lubricants.

In order to process halogen-containing polymers with the stabilizer composition according to the present invention, the methods known in the state of the art may be used. Examples of such methods include, but are not limited to, calendering, extrusion, injection moulding, blow moulding and the like.

From the stabilized halogen-containing polymers made according to the invention several products for different applications may be prepared. For example, window profiles, pipes, floor coverings, roof sheets, cables and films may be prepared from the stabilized polymers. Furthermore, the polymers may be used in materials for example for sport boats, rotor blades for wind-powered devices and in wagon building.

Figure 2:
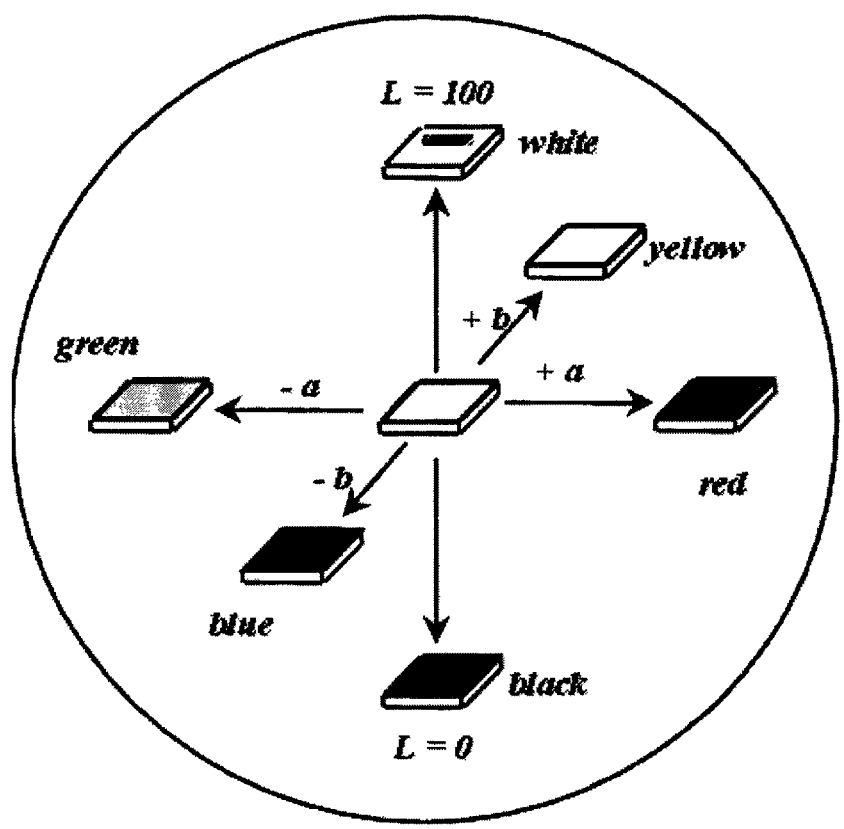
FIG. 2 illustrates a diagram for the determination and archiving of a color.
Figure 3:
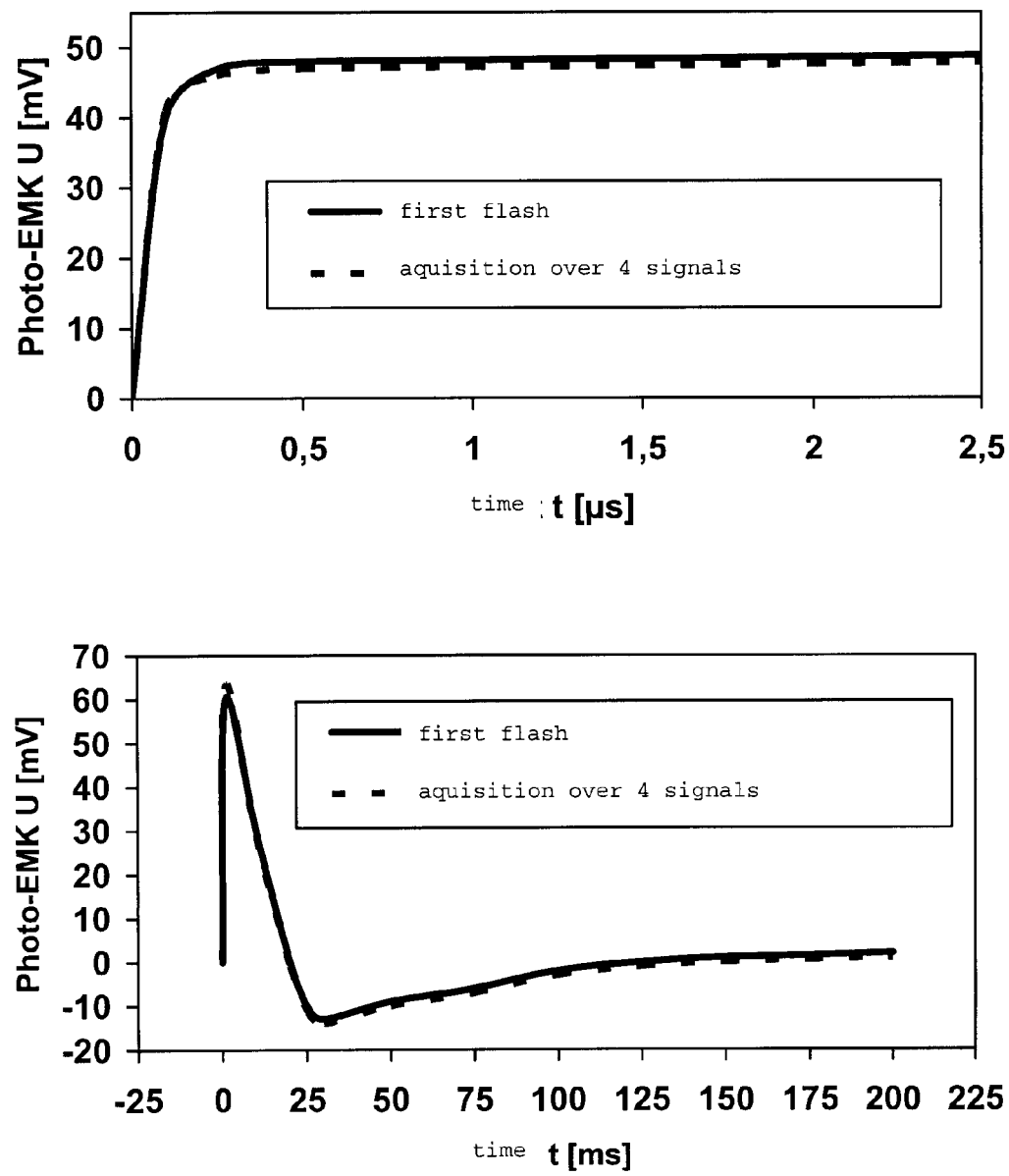
FIG. 3 illustrates a photo-EMK signal of a dispersion layer of the $TiO_2$-charge Kronos 1001 with PVB as binder; about $2.7*10^{13}$ quanta per flash; total absorption; flash distance 120 s.
Figure 4:
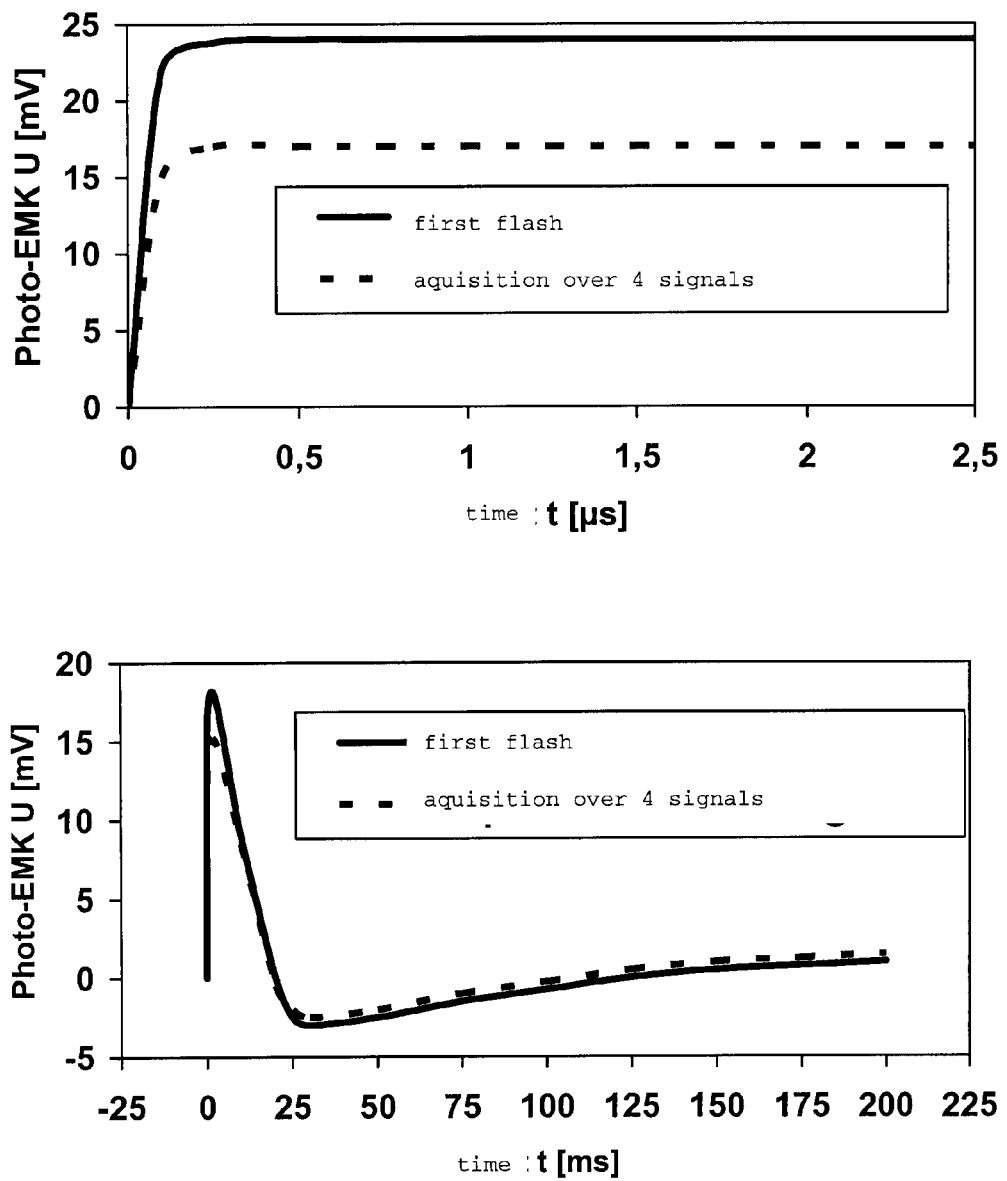
FIG. 4 illustrates a photo-EMK signal of a dispersion layer of the $TiO_2$-charge Kronos 1014 with PVB as binder; about $2.7*10^{13}$ quanta per flash; total absorption; flash distance 120 s.
Figure 5:
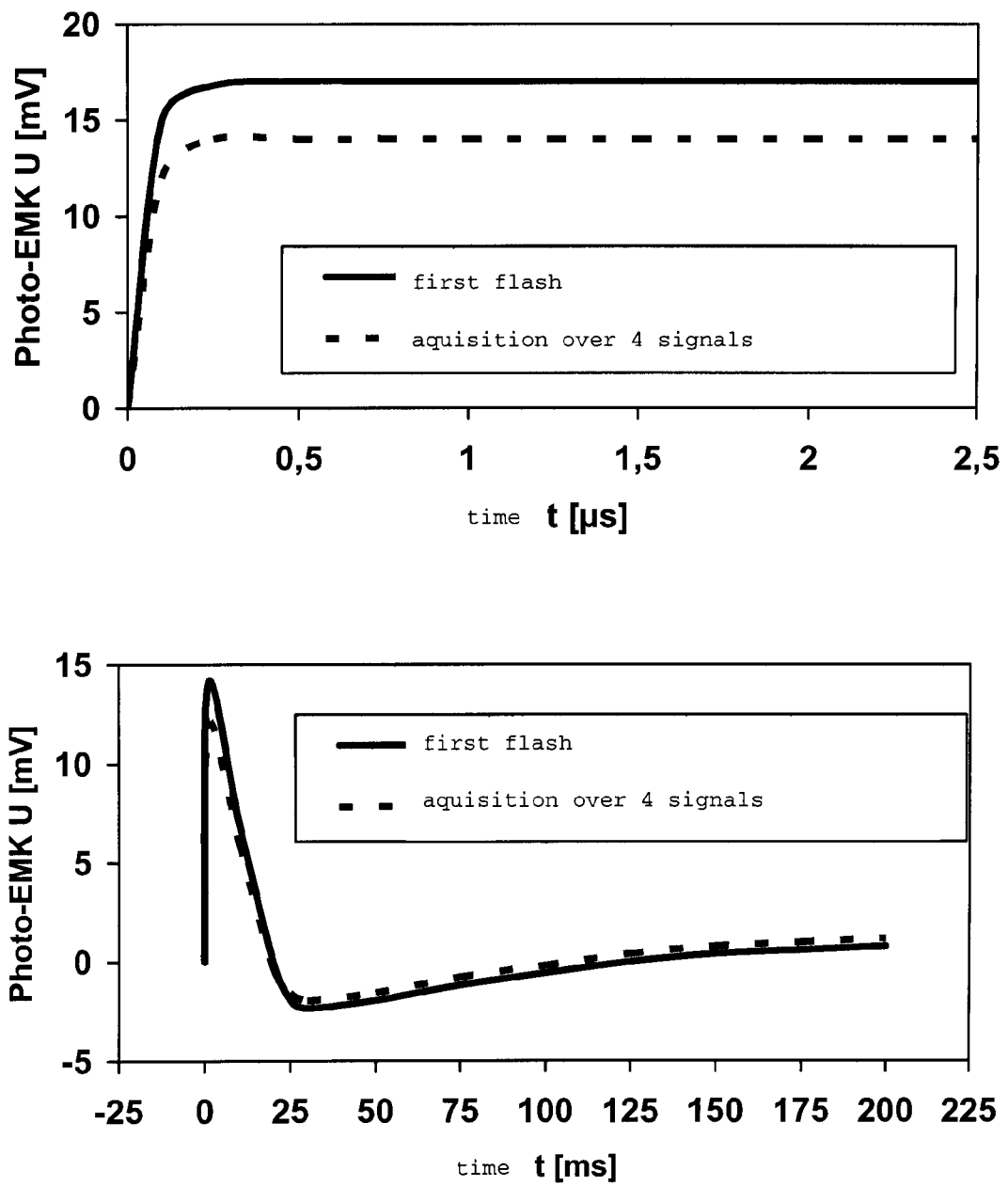
FIG. 5 illustrates a photo-EMK signal of a dispersion layer of the $TiO_2$-charge Kronos 1071 with PVB as binder; about $2.7*10^{13}$ quanta per flash; total absorption; flash distance 120 s.
Figure 6:
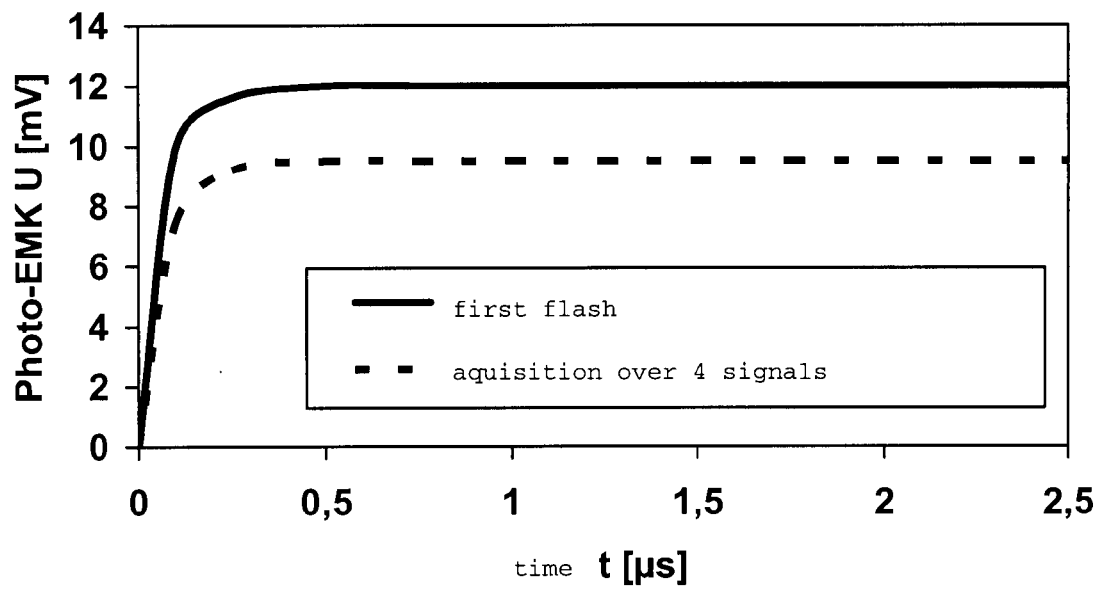
FIG. 6 illustrates a photo-EMK signal of a dispersion layer of the $TiO_2$-charge Kronos 1080 with PVB as binder; about $2.7*10^{13}$ quanta per flash; total absorption; flash distance 120 s.
Figure 6:
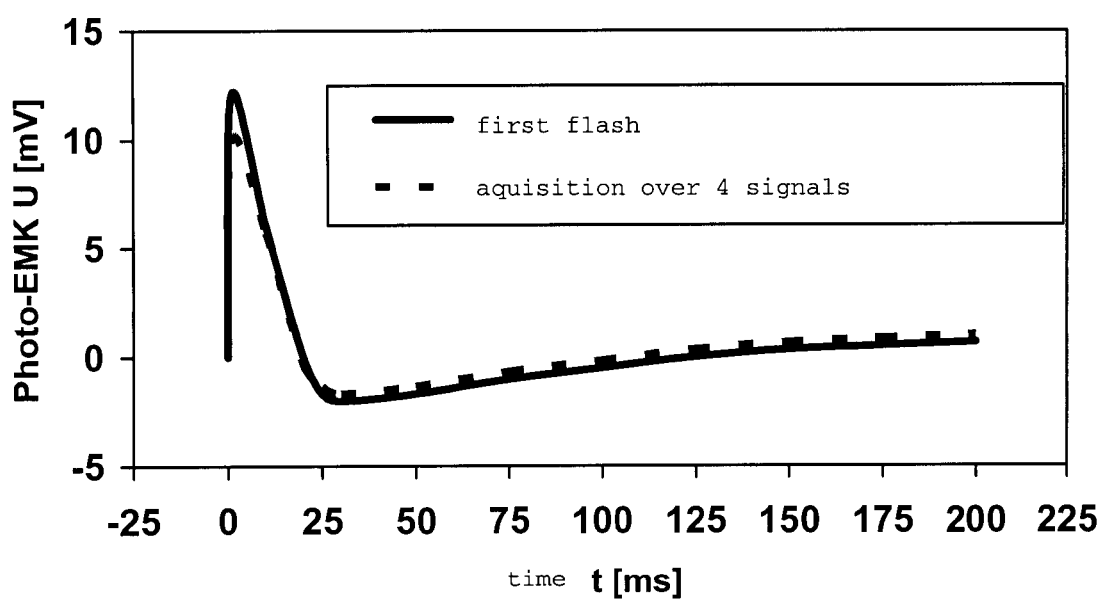
Figure 7:
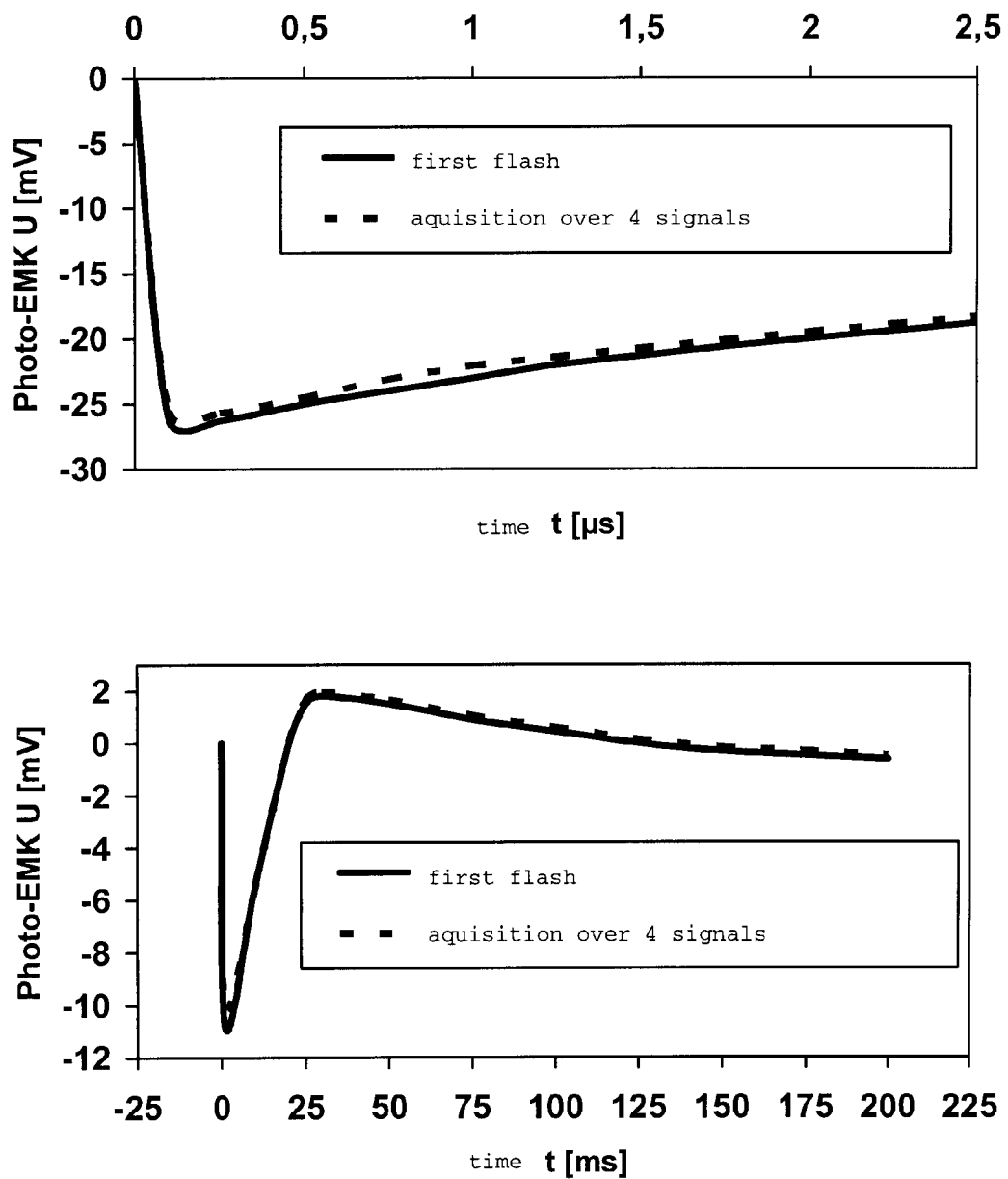
FIG. 7 illustrates a photo-EMK signal of a dispersion layer of the $TiO_2$-charge prepared in accordance with the chloride process 2 with PVB as binder; about $2.7*10^{13}$ quanta per flash; total absorption; flash distance 120 s.
Figure 8:
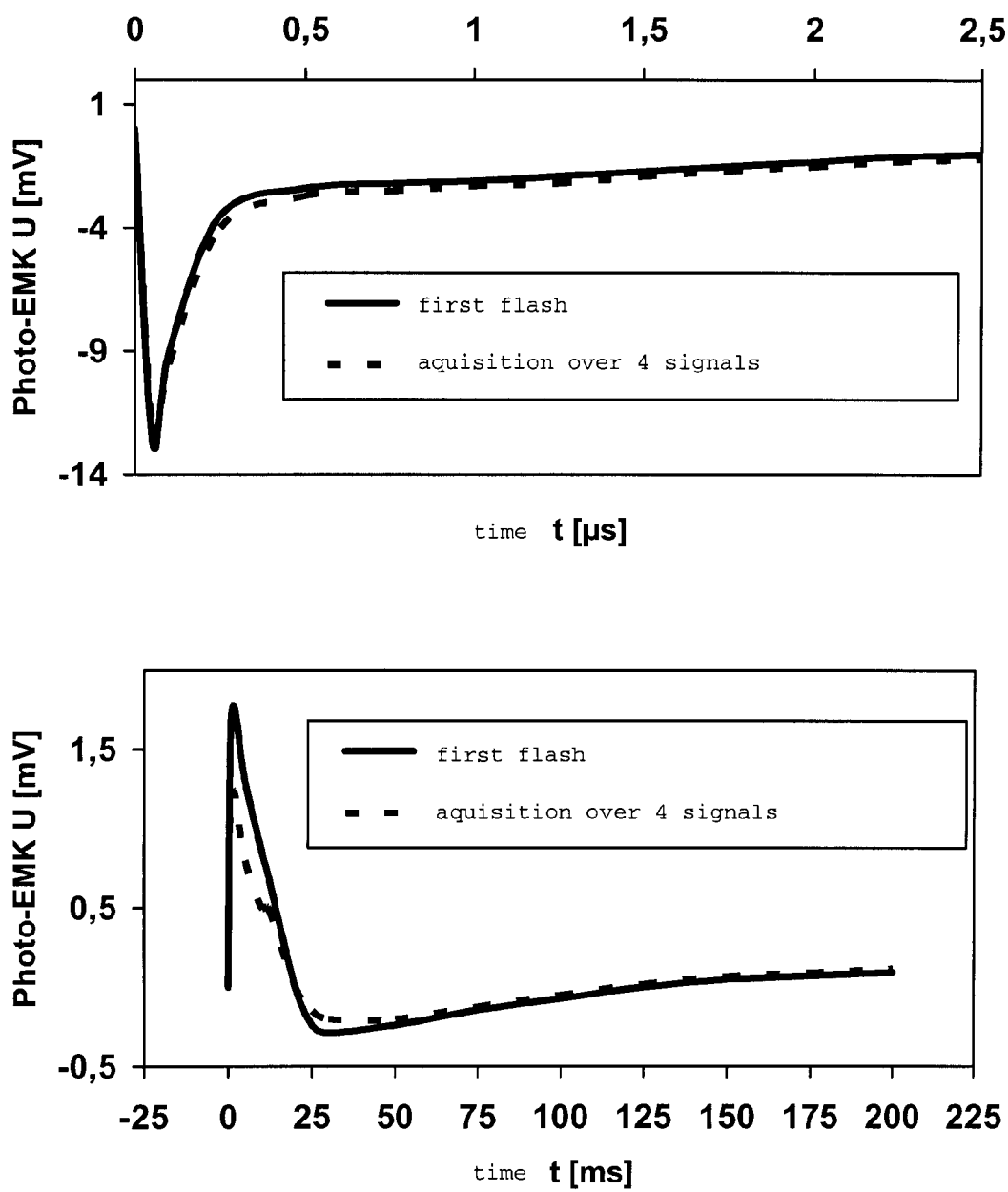
FIG. 8 illustrates a photo-EMK signal of a dispersion layer of the $TiO_2$-charge prepared in accordance with the chloride process 1 with PVB as binder; about $2.7*10^{13}$ quanta per flash, total absorption; flash interval 120 s.

In order to evaluate the color characteristics of the so prepared halogen-containing polymers and products therefrom, which contain the stabilizer composition according to present invention, the CIE-Lab-system is used. The CIE-Lab-system is a color space specified in 1976 by the International Commission on Illumination (Comission international de l'Eclairage, CIE). In this three-dimensional color space three axes are defined (L=brightness (0=black, 100=white); a=red–green (−120=green, +120=red); b=yellow–blue (−120=blue, +120=yellow)). By indicating the L*a*b*-values as well as the indication of the color measuring device (spectral photometer), kind of light, observer, color system and sample preparation, a color may be accurately determined and archived (see diagram in FIG. 2). Thus, the a-value represents the color on the green-red axis. Negative a-values show a green cast and positive a red cast. The higher the a-value, the stronger is the red cast. Therefore, as preferably neutral value for a in the present invention and a preferably slight change of this value, respectively, is desirably.

Therefore, the present invention makes a remarkable and new contribution to the development of the state of the art, in particular for the processing and stabilization of PVC and other halogen-containing thermoplastic polymers.

The invention will be illustrated in more detail by the following examples, however, without being limited thereon.

EXAMPLES

In the subsequent examples various compositions of PVC mouldings will be described. For the preparation the components mentioned in the examples were weighed, were cold homogenized in a laboratory mixer and were homogenized and plasticized on a laboratory rolling mill for five minutes at 180° C. From the so prepared sheeted-out compound having a thickness of 1 mm, two test strips of 10*10 cm$^2$ have been cut out, laid on top of each other and grouted at 170° C. at 100 bar for 5 min.

From these 2 mm thick press plates, strips having a thickness of 2 mm have been cut out and irradiated for 168 hours in a Bandol Wheel (see for example www.metrastat.com/), which is known in the state of the art, using the following conditions:
- one revolution per hour
- 120° of the revolution shaded
- 120° of the revolution in a water basin with dist. water
- (in each case 60° of the shading are in the air and in dist. water, respectively)
- 50° C. in the sample area
- 400 W mercury medium pressure lamp.

The L*a*b-color values of the reference sample and of the irradiated sample (Tab. 3) have been determined.

Example 1

Not According to the Invention

Formulation (Indications in phr)

| | |
|---|---|
| PVC (k = 67) | 100 |
| coated chalk | 2 |
| paraffin wax (Fp ~100° C.) | 0.1 |
| tribasic lead sulphate | 0.5 |
| neutral lead stearate | 0.8 |
| dibasic lead stearate | 0.3 |
| calcium stearate | 0.3 |
| TiO$_2$[1] | 2.0 |

[1] Commercial rutile pigment prepared according to the chloride process 1, wherein the photo-EMK characterization is shown in Tab. 1 and Tab. 2.

Initial Color Values:

L 94.3 b 7.8 a −0.1

Example 2

Not According to the Invention

Formulation (Indications in phr)

| | |
|---|---|
| PVC (k = 67) | 100 |
| coated chalk | 2 |
| TiO₂[1] | 2.0 |
| paraffin wax (Fp ~100° C.) | 1.0 |
| ester wax | 0.2 |
| calcium stearate | 0.3 |
| Alcamizer 1[2] | 0.7 |
| 1,3-dimethyl-4-aminouracil | 0.3 |
| Sodium perchlorate | 0.01 |

[1] Commercial rutile pigment as in example 1
[2] Commercial hydrotalcite of the company Kyowa Initial Color Values:
L 95.8
b 7.1
a −0.7

Example 3

According to the Invention

Formulation (Indications in phr)

| | |
|---|---|
| PVC (k = 67) | 100 |
| coated chalk | 2 |
| Kronos 1001 - TiO₂[1] | 2.0 |
| paraffin wax (Fp ~100° C.) | 1.0 |
| ester wax | 0.2 |
| calcium stearate | 0.3 |
| Alcamizer 1[2] | 0.7 |
| 1,3-dimethyl-4-aminouracil | 0.3 |
| sodium perchlorate | 0.01 |

[1] Commercial titanium dioxide with photo-EMK characterization in Tab. 1 and Tab. 2
[2] Commercial hydrotalcite of the company Kyowa Initial Color Values:
L 95.5
b 5.8
a −0.3

Example 4

According to the Invention

Formulation (Indications in phr)

| | |
|---|---|
| PVC (k = 67) | 100 |
| coated chalk | 2 |
| Kronos 1071 - TiO₂[1] | 2.0 |
| paraffin wax (Fp ~100° C.) | 1.0 |
| ester wax | 0.2 |
| calcium stearate | 0.3 |
| Alcamizer 1[2] | 0.7 |
| 1,3-dimethyl-4-aminouracil | 0.3 |
| sodium perchlorate | 0.01 |

[1] Commercial titanium dioxide with photo-EMK characterization in Tab. 1 and Tab. 2
[2] Commercial hydrotalcite of the company Kyowa Initial Color Values:
L 93.5
b 5.6
a −0.9

Example 5

According to the Invention

Formulation (Indications in phr)

| | |
|---|---|
| PVC (k = 67) | 100 |
| coated chalk | 2 |
| Kronos 1080 - TiO₂[1] | 2.0 |
| paraffin wax (Fp ~100° C.) | 1.0 |
| ester wax | 0.2 |
| calcium stearate | 0.3 |
| Alcamizer 1[2] | 0.7 |
| 1,3-dimethyl-4-aminouracil | 0.3 |
| sodium perchlorate | 0.01 |

[1] Commercial titanium dioxide with photo-EMK characterization in Tab. 1 and Tab. 2
[2] Commercial hydrotalcite of the company Kyowa Initial Color Values:
L 95.0
b 6.2
a −0.7

Example 6

According to the Invention

Formulation (Indications in phr)

| | |
|---|---|
| PVC (k = 67) | 100 |
| coated chalk | 2 |
| Kronos 1001 - TiO₂[1] | 2.0 |
| paraffin wax (Fp ~100° C.) | 1.0 |
| ester wax | 0.2 |
| calcium stearate | 0.3 |
| Alcamizer 1[2] | 0.7 |
| 1,3-dimethyl-4-aminouracil | 0.3 |
| sodium perchlorate | 0.01 |

[1] Commercial titanium dioxide with photo-EMK characterization in Tab. 1 and Tab. 2
[2] Commercial hydrotalcite of the company Kyowa Initial Color Values:
L 95.2
b 6.0
a −0.3

Example 7

Not According to the Invention

Formulation (Indications in phr)

| | |
|---|---|
| PVC (k = 67) | 100 |
| coated chalk | 2 |
| TiO₂[1] | 2.0 |
| paraffin wax (Fp ~100° C.) | 1.0 |
| ester wax | 0.2 |
| calcium stearate | 0.3 |
| Alcamizer 1[2] | 0.7 |
| 1,3-dimethyl-4-aminouracil | 0.3 |
| sodium perchlorate | 0.01 |

[1] Commercial rutile pigment prepared according to the chloride process 2 with photo-EMK characterization in Tab. 1 and Tab. 2
[2] Commercial hydrotalcite of the company Kyowa Initial Color Values:
L 95.4
b 7.4
a −0.7

The characterization of the titanium dioxides used in the above-mentioned examples by means of photo-EMK can be taken from Table 1 (kinetic parameters of the photo-EMK measurement in PVB (measurement range 0-2.5 µs, signals after that first laser flash).

The measurement of the photo-EMK is carried out as indicated in the above description. In particular, 100 mg of the pigment have been dissolved in 3 g of a 10% polyvinyl butyral solution in 1,2-dichloroethane by means of ultrasound. The mixture has been applied on a glass plate (27 cm$^2$). After drying of the pigment the polymeric layer has been removed from the glass substrate. The remaining solvent is removed in vacuum. The sample(s) are installed into the measuring cell and irradiated with a flash of the nitrogen laser ("PNL100"; LTB Lasertechnik Berlin, $\lambda_{flash}$ h=337 nm, $\tau_{1/2}$=0.3 ns, 2.7× 10$^{13}$ quanta per flash). The voltage which is developing in the sample is tapped at the electrodes in an electroless way (as indicated above), i.e. measured without galvanic contact, as there are insulative films between the sample and the electrodes. This prevents charge injection from the electrodes into the sample. The preamplifier has an impedance of about 1 TΩ and the photo-EMK measurement takes place without an external electric field. The maximum time resolution is about 40 ns. All experiments have been carried out under normal pressure and at 25° C. In all cases the signal of first laser flash has been recorded. In further test experiments the time difference between two flashes has been 120 s (acquisition measurement). A detailed description of the used photo-EMK apparatus can be found in G. Israel et al., J. Inform. Rec. 23 (1997), 559-584.

The maximum value of the photo-EMK is determined directly from the experimental curves, wherein the curves are kinetically evaluated according to a bi-exponential time, wherein the lifetime of the charge carriers near the surface and in the volume can be determined.

The results of the single measurements may also be taken from Tables 1 and 2 as well as FIGS. 3 to 8.

TABLE 1

Photo-EMK values of the titanium dioxides from the examples 1-7

| Sample | $U_{max}$/mV | $U_1$/mV | $U_2$/mV | $10^{-6} k_1 * s$ | $10^{-5} k_2 * s$ |
|---|---|---|---|---|---|
| Kronos 1001 | ~48 (S) | | | | |
| Kronos 1014 | ~24 (S) | | | | |
| Kronos 1071 | ~16 (S) | | | | |
| Kronos 1080 | ~12 (S) | | | | |
| TiO$_2$ (Ex. 7) | −26.3 | −5.6 | −20.6 | 2.8 | 0.6 |
| TiO$_2$ (Ex. 1) | −20.5 | −15.2 | −5.3 | 12.9 | 4.7 |

S: only the increase of the signal has been observed, but no deactivation; the values for $U_1$, $U_2$, $k_1$ and $k_2$ cannot be calculated in the µs-range.

The further characterization of the titanium dioxides used in the above-mentioned examples by means of photo-EMK can be taken from Table 2 (kinetic parameters of the photo-EMK measurement in PVB (measurement range 0-200 ms, signals after that first laser flash).

TABLE 2

Photo-EMK values of the titanium dioxides from the examples 1-7

| Sample | $U_{max}$/mV | $U_1$/mV | $U_2$/mV | $k_1 * s$ | $k_2 * s$ |
|---|---|---|---|---|---|
| Kronos 1001 | 60.2 | 418 | −412 | 51 | 45 |
| Kronos 1014 | 19.2 | 255 | −253 | 45 | 44 |
| Kronos 1071 | 14.3 | 163 | −162 | 47 | 46 |
| Kronos 1080 | 12.2 | 1500 | −1487 | 48 | 47 |
| TiO$_2$ (Bsp. 7) | 1.0 | 252 | −250 | 43 | 42 |
| TiO$_2$ (Ex. 1) | −10.0 | −247 | 237 | 60 | 43 |

Example 8

In Table 3 the changes of the a-values of the above prepared example polymers upon irradiation in the Bandol Wheel (50° C.) are given.

TABLE 3

| Example | a-values after 0 hours | a-values after 168 hours |
|---|---|---|
| 1 | −0.1 | −0.4 |
| 2 | −0.7 | 1.4 |
| 3 | −0.3 | −0.8 |
| 4 | −0.9 | −0.3 |
| 5 | −0.7 | −0.6 |
| 6 | −0.3 | 0.0 |
| 7 | −0.7 | 1.6 |

In examples 2 and 7 which are not according to the invention, including the 1,3-dimethyl-4-aminouracil-containing formulations, the determined a-values show a significant positive, i.e. "red" shifting color change, after short, but intense irradiation time. In example 1, which is not according to the invention, based on lead stabilizers and without 1,3-dimethyl-4-aminouracil, the a-value remains negative, i.e. green.

Inventive example 3, 4, 5 and 6, however, show a significant effect by the influence of the inventive stabilizer compounds. On the one hand, only very slight changes can be recognized and the a-values are only slightly negative, i.e. at maximum a slight green cast may be observed. Thus, pinking of the polymers and the products prepared therefrom, for example window profiles, can be prevented.

Example 9

From the following Table 4 further examples can be taken, which have been prepared according to the above-mentioned method. In Table 4, the photo-EMK and the ability for stabilizing halogen-containing polymers is shown for different titanium dioxides. It is obvious from Table 4 that the halogen-containing polymers, which are stabilized with titanium dioxides (and a nitrogen compound), which do not show the inventive photo-EMK, after 120 h and 180 h, respectively, in the Bandon Wheel experiment, exhibit a significant pinking (see Δa 120- and Δa 180-values).

Figure 9:
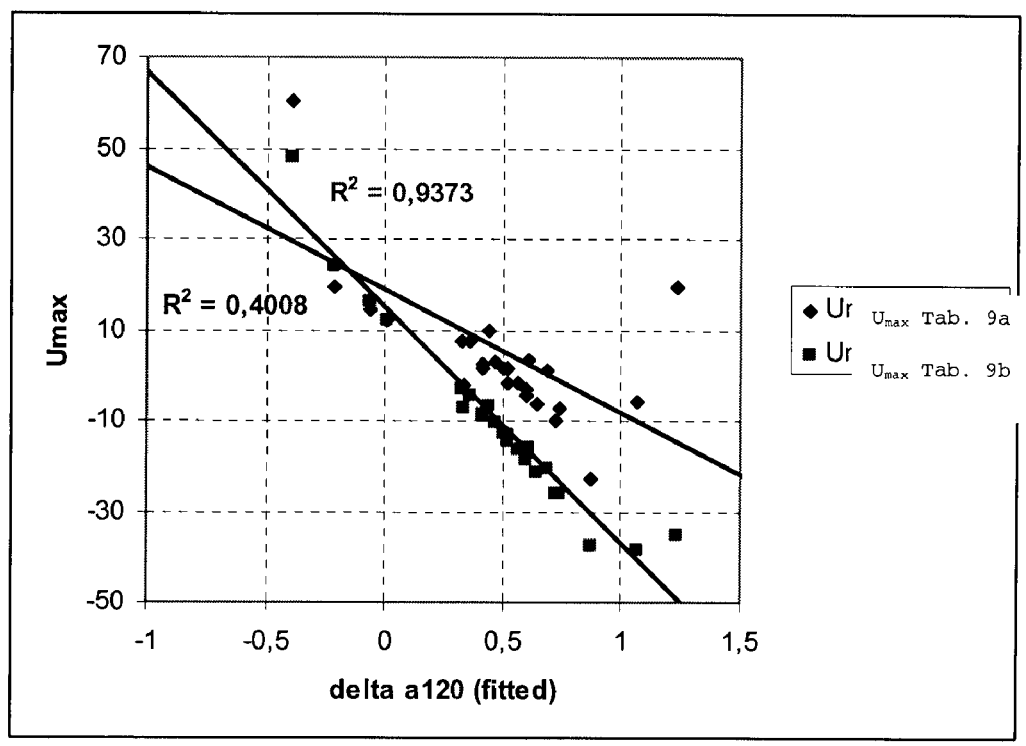
FIG. 9 illustrates La-values of example 9 (after 120 h in the Bandol Wheel, calculated from the predictions in echip with L=95.3, a=−0.3, b=5.8) against the Umax values ("Umax Tab. 9a"=Umax in the ms-range, 1 flash, "Umax Tab. 9b"=Umax in the μs-range, 1 flash)–trend line linear.

FIG. 9 contains the graphical illustration of the a-values (after 120 h in the Bandol Wheel) vs. the $U_{max}$-values from Table 4 after taking out the initial color.

TABLE 4

Test results

| Sample[1,2] | | L(0) | b(0) | a(0) | Umax[3] | Umax[4] | Umax[5] | Umax[6] | Δa 120 | Δa 180 |
|---|---|---|---|---|---|---|---|---|---|---|
| Kronos 1001 | 1 | 95.28 | 5.81 | −0.28 | 60.2 | 57.7 | 48.0 | 47.0 | −0.60 | −0.35 |
| Kronos 1014 | 20 | 95.52 | 6.00 | −0.30 | 19.2 | 16.6 | 24.0 | 17.0 | −0.02 | 0.55 |
| Kronos 1071 | 2 | 93.49 | 5.58 | −0.90 | 14.3 | 13.3 | 16.0 | 13.0 | 0.35 | 0.70 |
| Kronos 1080 | 21 | 94.95 | 6.22 | −0.68 | 12.2 | 10.6 | 12.0 | 9.0 | −0.16 | 0.17 |
| Kronos 2044 | 15 | 94.87 | 8.31 | −0.80 | −2.0 | −2.0 | −7.3 | −7.2 | 0.75 | 1.25 |
| Kronos 2056 | 11 | 95.03 | 8.10 | −0.68 | −4.3 | −3.4 | −18.8 | −19.3 | 0.81 | 1.24 |
| Kronos 2059 | 17 | 95.43 | 7.02 | −0.52 | 7.6 | 7.5 | −3.0 | −2.8 | 0.79 | 1.17 |
| Kronos 2073 | 27 | 96.02 | 6.43 | −0.55 | −2.9 | −3.2 | −18.4 | −18.6 | 0.99 | 1.37 |
| Kronos 2075 | 23 | 96.00 | 6.43 | −0.61 | −1.9 | −2.4 | −16.6 | −17.4 | 0.64 | 1.02 |
| Kronos 2081 | 9 | 95.21 | 7.64 | −0.62 | −7.1 | −7.7 | −25.9 | −25.8 | 0.96 | 1.42 |
| Kronos 2084 | 5 | 95.40 | 7.38 | −0.65 | −10.0 | −10.5 | −26.3 | −25.8 | 0.93 | 1.29 |
| Kronos 2087 | 8 | 94.38 | 7.79 | −0.33 | −22.7 | −20.4 | −37.6 | −37.2 | 0.94 | 1.25 |
| Kronos 2160 | 12 | 95.59 | 6.97 | −0.63 | −1.8 | −1.8 | −14.8 | −14.5 | 0.86 | 1.29 |
| Kronos 2190 | 16 | 95.14 | 7.40 | −0.54 | 7.6 | 7.5 | −4.4 | −4.6 | 0.76 | 1.13 |
| Kronos 2220 | 10 | 95.76 | 7.09 | −0.70 | 1.0 | 1.0 | −20.5 | −19.7 | 1.10 | 1.47 |
| Kronos 2222 | 22 | 95.95 | 5.96 | −0.51 | 2.3 | 2.2 | −8.6 | −8.2 | 1.22 | 1.65 |
| Kronos 2310 | 13 | 95.79 | 7.08 | −0.69 | 1.7 | 1.6 | −13.3 | −13.3 | 1.12 | 1.57 |
| Kronos 2400 | 14 | 95.97 | 5.96 | −0.46 | 1.4 | −1.8 | −9.0 | −11.1 | 0.61 | 0.96 |
| Kronos 3025 | 6 | 89.74 | 11.28 | −0.61 | 19.2 | 16.6 | −35.4 | −37.6 | 1.66 | 2.84 |

[1] red L a b-values have been taken from lines 9, 10 and 12, respectively, the photo-EMK values are double measurements
[2] blue values correspond to the estimated Umax from the graph
[3] Umax in ms-range, 1 flash
[4] Umax in ms-range, acquisition
[5] Umax in μs-range, 1 flash
[6] Umax in μs-range, acquisition

The invention claimed is:

1. A stabilizer composition for halogen-containing polymers comprising titanium dioxide and at least one nitrogen-containing compound, wherein the titanium dioxide has a photo-electromotive force (photo-EMK) in the μs-range >−15 mV and a photo-electromotive force in the ms-range >+5 mV, wherein the nitrogen-containing compound is selected from the group consisting of a heterocyclic compound, an amine and an aminocrotonic acid ester, wherein the heterocyclic compound is selected from the group consisting of substituted or unsubstituted uracil, pyrimidone and indole and wherein the aminocrotonic acid ester has the general formula (III)

(III)

wherein $R_5$ is H, $C_1$-$C_{18}$ alkyl, $C_2$-$C_6$ alkenyl, $C_1$-$C_4$ alkoxy, $C_5$-$C_8$ cycloalkyl or $C_5$-$C_{10}$ aryl, or wherein $R_5$ is selected in such a way that a symmetrical aminocrotonic acid ester is formed.

2. The stabilizer composition according to claim 1, wherein the titanium dioxide has a photo-electromotive force in the μs-range >−10 mV and a photo-electromotive force in the ms-range >+10 mV.

3. The stabilizer composition according to claim 1, wherein the uracil has the following formula (I)

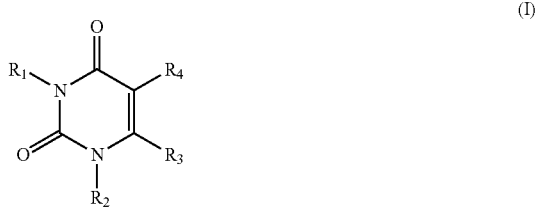

(I)

wherein $R_1$, $R_2$, $R_3$ and $R_4$ are independently H, $C_1$-$C_{18}$ alkyl, $C_2$-$C_6$ alkenyl, $C_1$-$C_4$ alkoxy, $C_5$-$C_8$ cycloalkyl, $C_5$-$C_{10}$ aryl, wherein $R_3$ and $R_4$ are independently $NHR_5$, wherein $R_5$ is, independently to $R_1$ or $R_2$, H, $C_1$-$C_{18}$ alkyl, $C_2$-$C_6$ alkenyl, $C_1$-$C_4$ alkoxy, $C_5$-$C_8$ cycloalkyl, $C_5$-$C_{10}$ aryl.

4. The stabilizer composition according to claim 1, wherein the nitrogen compound has the following formula (II)

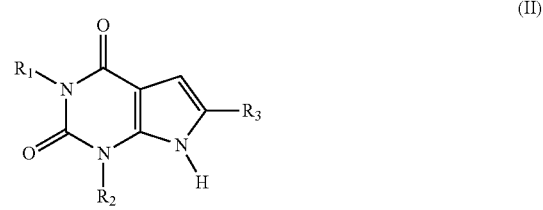

(II)

wherein $R_1$, $R_2$ and $R_3$ are independently H, $C_1$-$C_{18}$ alkyl, $C_2$-$C_6$ alkenyl, $C_1$-$C_4$ alkoxy, $C_5$-$C_8$ cycloalkyl, $C_5$-$C_{10}$ aryl.

5. The stabilizer composition according to claim 1, wherein the aminocrotonic acid ester is butyleneglycolaminocrotonate or thioethyleneglycolaminocrotonate.

6. The stabilizer composition according to claim 3, wherein the uracil is 1,3-dimethyl-4-aminouracil.

7. The stabilizer composition according to claim 1, wherein the titanium dioxide is present in an amount of about 0.05 to about 15.0 per 100 parts resin (phr).

8. The stabilizer composition according to claim 7, wherein the titanium dioxide is present in an amount of about 0.1 to about 10.0 phr.

9. The stabilizer composition according to claim 1, further comprising at least one co-stabilizer.

10. The stabilizer composition according to claim 1, further comprising primary stabilizers, zeolites, antioxidants, fillers, softeners, dyes, pigments, antistatic agents, surface-active agents, foaming agents, impact modifiers and/or UV stabilizers.

11. The stabilizer composition according to claim 1, wherein the titanium dioxide has rutile or anatase structure.

12. The stabilizer composition according to claim 1, wherein the halogen-containing polymer is PVC.

13. The stabilizer composition according to claim 1, wherein the photo-EMK is measured by a method comprising:

clamping the sample between a front and a back electrode;

irradiating the sample with a short light flash, wherein the wavelength of the excitation flash is 337 nm and the pulse duration is 0.3 ns;

measuring the voltage with a high impedance voltmeter.

14. A method for stabilizing halogen-containing polymers comprising:

providing a halogen-containing polymer; and contacting the halogen-containing polymer with a stabilizer composition according to claim 1 for stabilizing the halogen-containing polymers.

15. The method according to claim 14, wherein the stabilization is against effect of light.

16. The method according to claim 14, wherein the halogen-containing polymer is PVC.

17. Moulding comprising a halogen-containing polymer comprising a stabilizer composition according to claim 1.

18. Moulding of halogen-containing polymer comprising a stabilizer composition according to claim 1.

19. Moulding according to claim 17, wherein the moulding is window profiles, pipes, floor coverings, roof sheets, cables and films.

* * * * *